United States Patent [19]

Machado et al.

[11] 4,186,546

[45] Feb. 5, 1980

[54] DISPOSABLE BAG MOUNTING FOR A LAWN MOWER

[76] Inventors: Manuel Machado, c/o George Spector, 3615 Woolworth Bldg., 233 Broadway; George Spector, 3615 Woolworth Bldg., 233 Broadway, both of New York, N.Y. 10007

[21] Appl. No.: 935,016

[22] Filed: Aug. 18, 1978

[51] Int. Cl.[2] .......................................... A01D 35/22
[52] U.S. Cl. ...................................... 56/202; 56/16.6
[58] Field of Search ............... 56/16.6, 202, 203, 204, 56/205, 206

[56] References Cited

U.S. PATENT DOCUMENTS

| 3,708,968 | 1/1973 | Enters et al. | 56/202 |
| 3,802,173 | 4/1974 | Opitz | 56/202 |
| 3,974,631 | 8/1976 | Rhodes | 56/202 |
| 3,987,606 | 10/1976 | Evans | 56/202 |
| 4,030,273 | 6/1977 | Leader | 56/202 |

*Primary Examiner*—Russell R. Kinsey
*Assistant Examiner*—Paul J. Hirsch

[57] ABSTRACT

A replaceable thin polyethylene bag attachable to a rotary power lawn mower for catching grass clippings, the mower including a duct leading upward from the underside chamber wherein the cutter blade rotates, the bag being fitted on the end of the duct and standing upon a supporting platform mounted on a rear end of the mower, and the bag being perforated with air vent holes so to allow escape of air while the grass clippings collect inside the bag, and in one design the mower platform automatically is rearwardly downwardly pivoted to unload a bag when filled while a pivotable nozzle automatically positions a next bag for loading.

3 Claims, 5 Drawing Figures

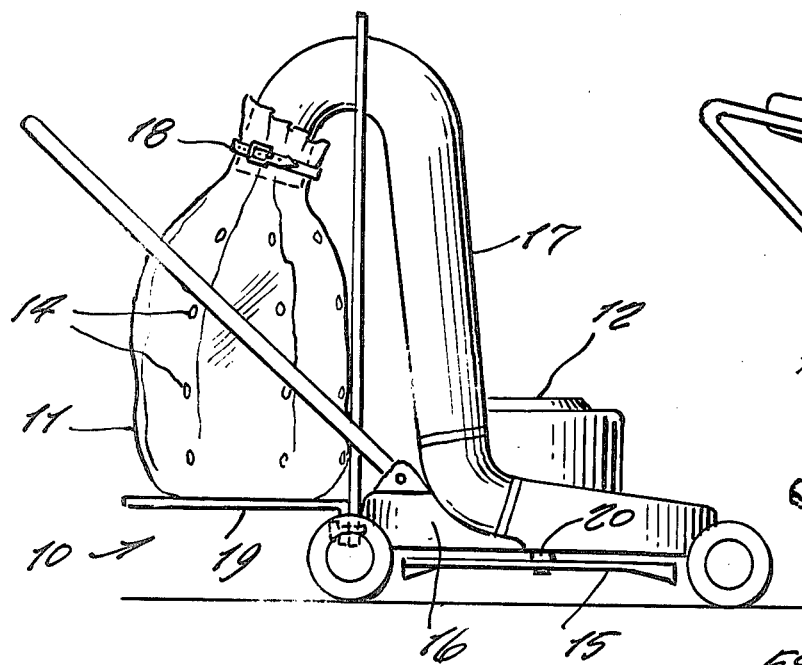
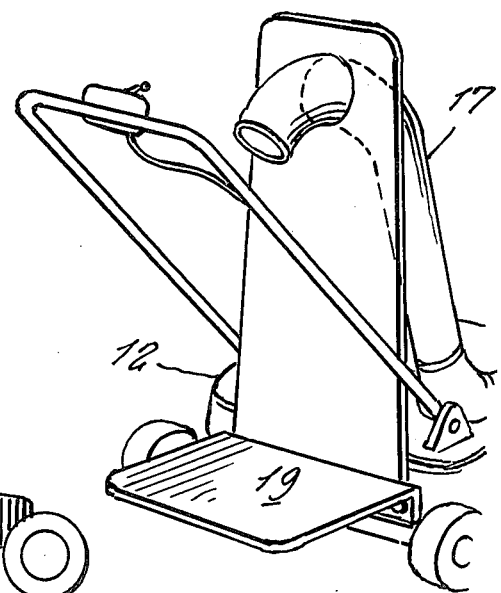
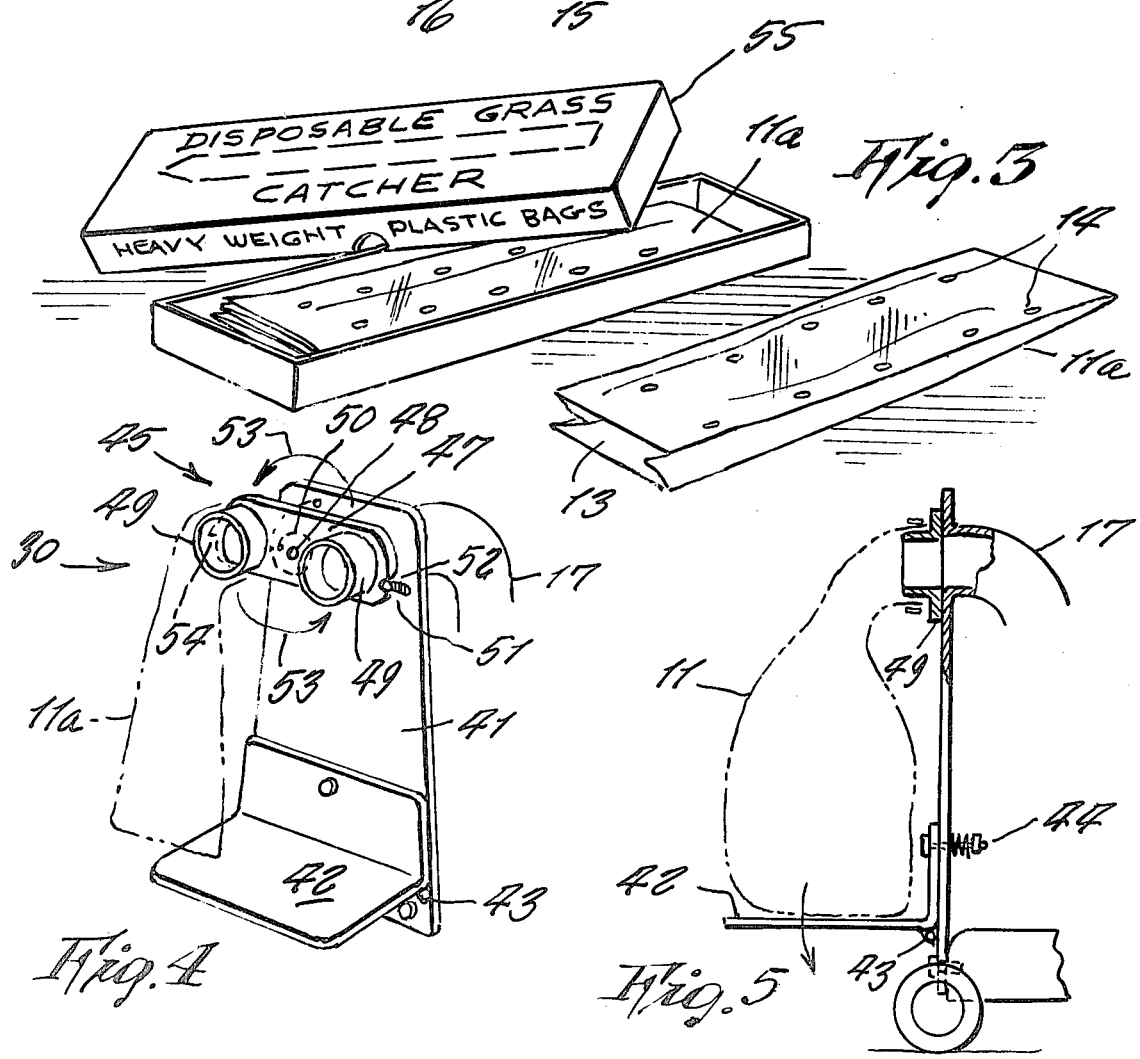

DISPOSABLE BAG MOUNTING FOR A LAWN MOWER

This invention relates generally to grass-catching devices for lawn mowers.

Heretofore many devices have been used for mounting on a lawn mower in order to catch grass clippings so to eliminate raking up the clippings afterwards. Usually these comprised a hopper from which the clippings could then be dumped into a bag for disposal. This consisted of an extra chore and necessitate stopping to mowing operation when the hopper got filled, so to dump out the hopper.

In the present invention a principal object is for the grass clippings to collect directly in disposable bags so to eliminate transfer them from a hopper first, and the bags being perforated with air vent holes so to allow escape of forced air that carries the clippings from the mower cutter blade to the bag.

Another object is to provide a bag made of thin polyethylene plastic so to be cheap for discarding together with the clippings.

Another object is to provide a power mower having a duct leading from the grass blade cutting area, so a bag can be fitted on the end of the duct, and the power also having a platform on which the bag can rest.

Still another object is to provide a mower which automatically drops a bag when fully loaded and at the same time positions a next bag for filling, without need of stopping mowing operation.

FIG. 1 is a side view of the invention mounted on a rotary power lawnmower.

FIG. 2 is a perspective view of the bag support.

FIG. 3 is a package for retailing a quantity of disposable grass catcher bags.

FIGS. 4 and 5 are perspective and side views respectively of a modified design of the supporting structure which automatically drops a grass-filled bag from the mower platform and automatically positions a spare bag for receiving grass without need to stop a mowing operation in progress.

Referring now to the drawing in detail, and more particularly to FIGS. 1 to 3 thereof at this time, the reference numeral 10 represents a combination of a novel disposable bag 11 and a novel rotary power lawn mower 12 according to the present invention.

The bag is made of a polyethylene plastic, having a wide opening 13 for entry of grass clippings. Numerous small air holes 14 throughout the bag serve to vent the bag.

The mower includes a rotary blade 15 which cuts the grass and throws the grass clippings inside an inverted dome 16 connected to a duct 17, the duct extending upwardly and the bag being fitted on the duct upper end and secured thereto by a strap 18. A platform 19 is bolted to a rear of the mower for the bag to rest thereupon.

In use, the grass clippings are forced by the rotating blade to be blown up through the duct and into the bag. An air blade may also be fitted on the motor shaft 20 so to aid in blowing the clippings ahead, if needed. The air blown into the bag, along with the clippings, is vented out therefrom by means of the holes 14.

In FIGS. 4 and 5, a modified design 30 of the invention includes plate 41 stationarily affixed to the mower, while an angle-shaped platform 42 is pivotally attached to the plate by means of a hinge 43. A spring loaded pin 44 holds the platform horizontal. When the bag becomes heavy due to being filled with clippings, the weight thereof tilts the platform about the hinge so to cause the bag to slide off the platform.

A mechanism 45 serves to immediately replace the filled bag by a new bag 112. The mechanism includes a pivotable plate 47 rotatable about pin 48. A nozzle 49 at each end is selectively aligned with the outlet end of the duct 17. The mouth ends of bag 11 and bag 11a are each fitted on the nozzles. A wound-up spiral spring 50 between the plates 41 and 47 normally urges the plate 47 to rotate. A detent 51 supported on stationary plate 41 engages a notch 52 on the rotatable plate.

In operative use, when the filled bag 11 weighs the platform so to tilt and thus cause the bag to slide off the platform, the bag mouth pulls the nozzle so to rotate plate 47 and the notch to disengage with the detent. When the bag drops suddenly from the platform, the spring then rotates the freed plate 47 in direction indicated by arrows 53. The rotation is stopped when a projection 54 on the opposite end of plate 47 engages a pin of the detent, thus aligning the other nozzle with the duct, and the empty bag is thus positioned automatically for loading, without need to stop the mowing operation.

As shown in FIG. 3, the disposable bags can be retailed in a carton or package 55 that contains a supply of at least several thereof so to have an adequate number available whenever needed.

What is claimed is:

1. A lawn mower and disposable bag combination, comprising a disposable bag and a lawn mower with a platform on its rear for supporting said bag thereupon, a duct from an inverted dome around a grass clipping chamber of said mower extending upwardly, and a duct end aligned with a mouth of said bag, said platform being rearwardly downwardly pivotable about a hinge against an action of a spring loaded pin, a rotatable plate about a central stationary pin, a nozzle at each opposite end of said rotatable plate, said bag and a second disposable bag each fitted on said nozzles, a detent for retaining said rotatable plate in position for said nozzles successively to align with said duct end, and a wound up spring for rotating said rotatable plate.

2. The combination as set forth in claim 1, wherein said bags are made of polyethylene plastic, and include a plurality of air vent openings therethrough.

3. The combination as set forth in claim 2, wherein a separate strap around a neck of said bag secures said bag around said duct end.

* * * * *